(12) United States Patent
Lee

(10) Patent No.: US 8,961,311 B2
(45) Date of Patent: Feb. 24, 2015

(54) BUTTON STRUCTURE FOR GAME CONTROLLER

(71) Applicant: Cheng Uei Precision Industry Co., Ltd., New Taipei (TW)

(72) Inventor: Tsung Shih Lee, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 140 days.

(21) Appl. No.: 13/922,514

(22) Filed: Jun. 20, 2013

(65) Prior Publication Data
US 2014/0378227 A1    Dec. 25, 2014

(51) Int. Cl.
*A63F 13/02* (2006.01)

(52) U.S. Cl.
USPC .......................................... 463/37; 345/156

(58) Field of Classification Search
USPC .............................. 463/9–25, 31–42; 345/156
See application file for complete search history.

(56) References Cited

U.S. PATENT DOCUMENTS

| | | | |
|---|---|---|---|
| 2012/0142419 A1* | 6/2012 | Muramatsu | 463/37 |
| 2013/0098191 A1* | 4/2013 | Manullang et al. | 74/491 |
| 2013/0178290 A1* | 7/2013 | Joynes et al. | 463/37 |
| 2013/0207890 A1* | 8/2013 | Young | 345/156 |
| 2014/0008999 A1* | 1/2014 | Prest et al. | 307/119 |
| 2014/0024456 A1* | 1/2014 | Ashley et al. | 463/37 |
| 2014/0323220 A1* | 10/2014 | Lee | 463/37 |

\* cited by examiner

*Primary Examiner* — Masud Ahmed
(74) *Attorney, Agent, or Firm* — WPAT, P.C.; Anthony King

(57) ABSTRACT

A button structure includes a base frame longitudinally defining an arc-shaped guide slot, a sliding part transversely defining a guide channel and longitudinally slidably mounted on the base frame, a rotating part defining a guide pillar and rotatably mounted under the base frame with the guide pillar being inserted in the guide slot and the guide channel, and a button body having a lower portion pivoted to the base frame. A drive part is rotatably pivoted between an upper portion of the button body and the sliding part, and can drive the sliding part to longitudinally slide on the base frame by the push of the button body and an elastic part clamped between the drive part and the base frame, so as to drive the guide pillar to slide rearward and forward along the guide slot and the guide channel and further drive the rotating part to rotate.

6 Claims, 4 Drawing Sheets

BUTTON STRUCTURE FOR GAME CONTROLLER

BACKGROUND OF THE INVENTION

1. Field of the Invention

The present invention relates to a game controller, and more particularly to a button structure used in the game controller.

2. The Related Art

A game controller is usually connected to a game console or computer, and is a device used with games or entertainment systems to provide input to a video game, typically to control an object or character in the game. The game controller generally includes a circuit board assembled in the game controller and a plurality of buttons for operating the game controller by means of being pressed to trigger the circuit board. Some of the buttons are assembled in a front face of the game controller and generally pressed rearward to trigger the circuit board. Along with the different requirements of electronic technology, some electronic components will connect with or disconnect from the circuit board in a rotation way. So a button structure capable of converting the actions in different directions (namely converting the action of pressing the button into the rotation of the electronic components) is required.

SUMMARY OF THE INVENTION

An object of the present invention is to provide a button structure used in a game controller in which a circuit board is disposed. The button structure includes a button body assembled in a front face of the game controller, a base frame fixed in the game controller and located parallelly over the circuit board, a sliding part with a guide channel being transversely opened in a rear thereof, a drive part and a rotating part with electronic components being fixed thereon and away from a rotation axis thereof. The button body has a lower portion thereof pivoted to a front end of the base frame. A rear of the base frame defines an arc-shaped guide slot extending along a front-to-rear direction. The sliding part is slidably mounted on the base frame along the front-to-rear direction by virtue of the drive part being rotatably pivoted between an upper portion of the button body and a front end of the sliding part under the elasticity of an elastic part, wherein the elastic part is flexibly clamped between the drive part and the base frame. A guide pillar is protruded at a position of the rotating part away from the rotation axis. The rotating part is rotatably mounted to the rear of the base frame through the rotation axis thereof being pivoted to the centre of a circle of the guide slot. The rotating part is parallelly rotatable between the base frame and the circuit board. The guide pillar passes through the guide slot to be slidably inserted in the guide channel of the sliding part.

In use, the sliding part can slide on the base frame along the front-to-rear direction by virtue of the drive part under the push of the button body and the elastic part. The sliding of the sliding part can drive the guide pillar to slide rearward and forward along the guide slot under the cooperation of the guide slot and the guide channel and further drive the rotating part to rotate with respect to the circuit board. The rotation of the rotating part further drives the electronic components to electrically connect with or disconnect from the circuit board.

As described above, the button structure in this invention utilizes the cooperation of the button body, the base frame, the sliding part, the drive part, the elastic part and the rotating part to convert the actions in different directions (namely converting the action of pushing the button body along the front-to-rear direction into the rotation of the rotating part in a direction parallel to the circuit board), so as to achieve the electrical connection and disconnection of the electronic components fixed on the rotating part and the circuit board disposed in the game controller. In general, the button structure used in the game controller can utilize the cooperation action of machinery to coordinate the actions in the different directions easily.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
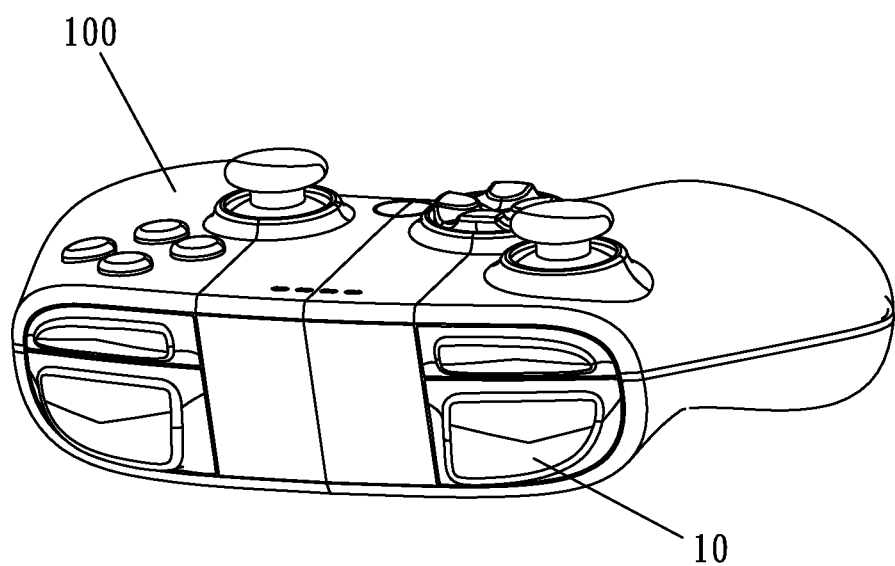
FIG. 1 is an assembled perspective view showing that a button structure is used in a game controller according to an embodiment of the present invention.
Figure 2:
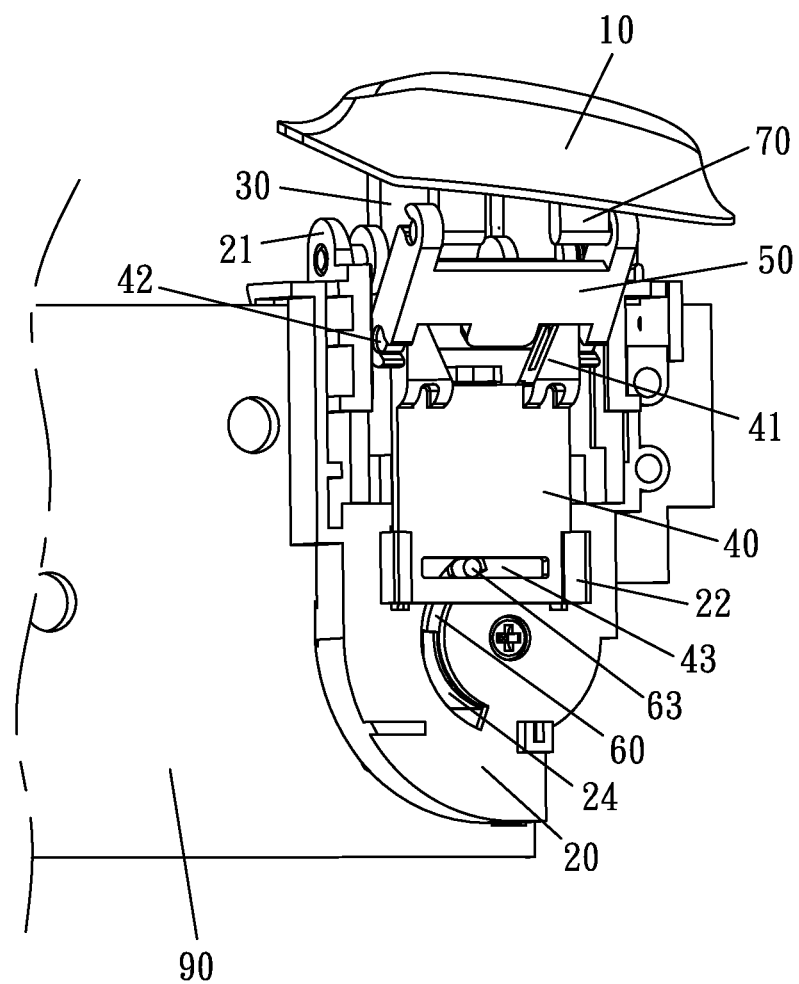
FIG. 2 is an assembled perspective view of the button structure of FIG. 1.
Figure 3:
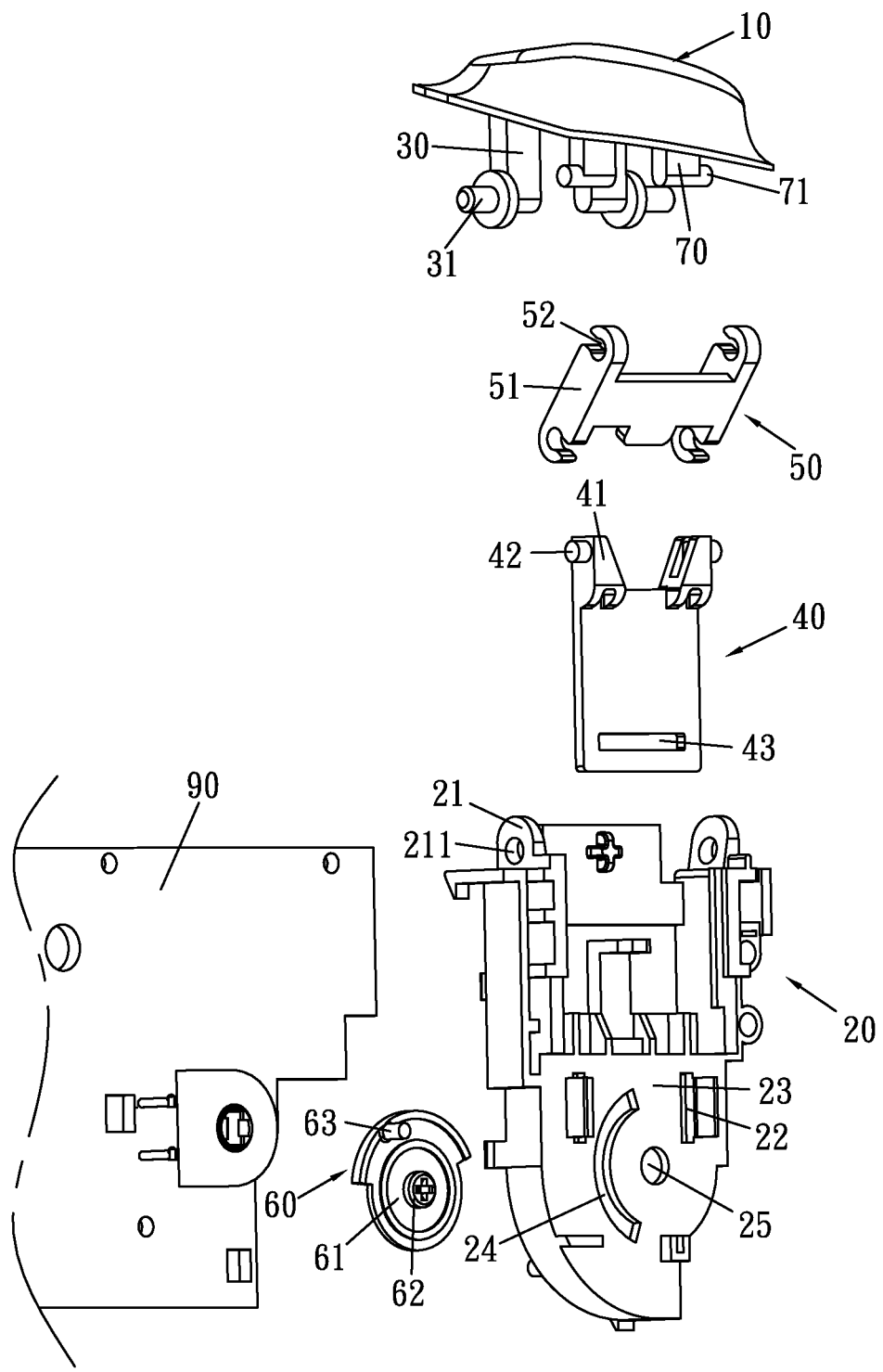
FIG. 3 is an exploded perspective view of the button structure of FIG. 2.

With reference to FIG. 1, FIG. 2 and FIG. 3, a button structure according to an embodiment of the present invention is used in a game controller 100 with a circuit board 90 horizontally disposed therein. The button structure includes a button body 10, a base frame 20, a sliding part 40, a drive part 50 and a rotating part 60, wherein there are electronic components (not shown) fixed to the rotating part 60 and away from a rotation axis 62 of the rotating part 60, and the electronic components can electrically connect with and disconnect from the circuit board 90 by virtue of the rotation of the rotating part 60.

The button body 10 is assembled in a front face of the game controller 100 and shows a cover shape with a middle portion being arched forward and brim all around being tilted rearward. The button body 10 has a pair of immovable pivotal arms 30 and a pair of driving pivotal arms 70. The immovable pivotal arms 30 have front ends thereof fixed to two sides of a lower position of a rear face of the button body 10, and rear ends thereof define a pair of first pivot shafts 31. The driving pivotal arms 70 have front ends thereof fixed to two sides of an upper position of the rear face of the button body 10, and rear ends thereof define a pair of second pivot shafts 71. In this embodiment, the driving pivotal arms 70 are shorter than the immovable pivotal arms 30 in length.

The base frame 20 is substantially of board shape and horizontally fixed in the game controller 100, wherein the base frame 20 is parallel over the circuit board 90 and located behind the button body 10. A pair of connecting arms 21 is protruded at two sides of a front end of the base frame 20, with a pair of pivot portions 211 being formed thereon respectively. The button body 10 is further pivoted to the front end of the base frame 20 by virtue of the cooperation of the first pivot shafts 31 of the immovable pivotal arms 30 and the pivot portions 211 of the connecting arms 21. A pair of restraining blocks 22 is protruded at two sides of a substantial middle of a surface of the base frame 20 opposite to the circuit board 90, and bent towards each other to define a sliding path 23 between the base frame 20 and the restraining blocks 22. A rear of the base frame 20 defines an arc-shaped guide slot 24 extending along a front-to-rear direction and located in rear of the sliding path 23. A hole 25 is opened in the rear of the base frame 20 and specifically at the centre of a circle of the guide slot 24.

The sliding part 40 is substantially of board shape with a guide channel 44 being transversely opened in a rear thereof. Two sides of a front end of the sliding part 40 protrude forward to form a pair of extension arms 41, and a pair of third pivot shafts 42 is oppositely protruded sideward at front ends of the extension arms 41. The drive part 50 is substantially of H-shape of which two lateral arms 51 each has two free ends thereof define a pivot hole 52 respectively. The sliding part 40 is slidably mounted on the base frame 20 along the front-to-rear direction by virtue of the drive part 50 being rotatably pivoted between the button body 10 and the sliding part 40 under the elasticity of an elastic part (not shown), wherein the elastic part is flexibly clamped between the drive part 50 and the base frame 20. In detail, the sliding part 40 is slidably disposed in the sliding path 23 by means of the restraint of the restraining blocks 22, the second pivot shafts 71 of the driving pivotal arms 70 and the third pivot shafts 42 of the extension arms 41 are pivoted to front two and rear two of the pivot holes 52 of the drive part 50 respectively.

The rotating part 60 is rotatably mounted to the rear of the base frame 20 through the rotation axis 62 thereof being pivoted to the centre of the circle of the guide slot 24, and is parallelly rotatable between the base frame 20 and the circuit board 90. The rotating part 60 has a disc-shaped base board 61 of which the center perpendicularly protrudes to form the rotation axis 62. The base board 61 further perpendicularly protrudes towards the same direction as the rotation axis 62 to form a guide pillar 63 at a substantial edge away from the rotation axis 62. In detail, the rotation axis 62 of the rotating part 60 is pivoted to the hole 25 of the base frame 20, and the guide pillar 63 passes through the guide slot 24 to be slidably inserted in the guide channel 43 of the sliding part 40.

Figure 4:
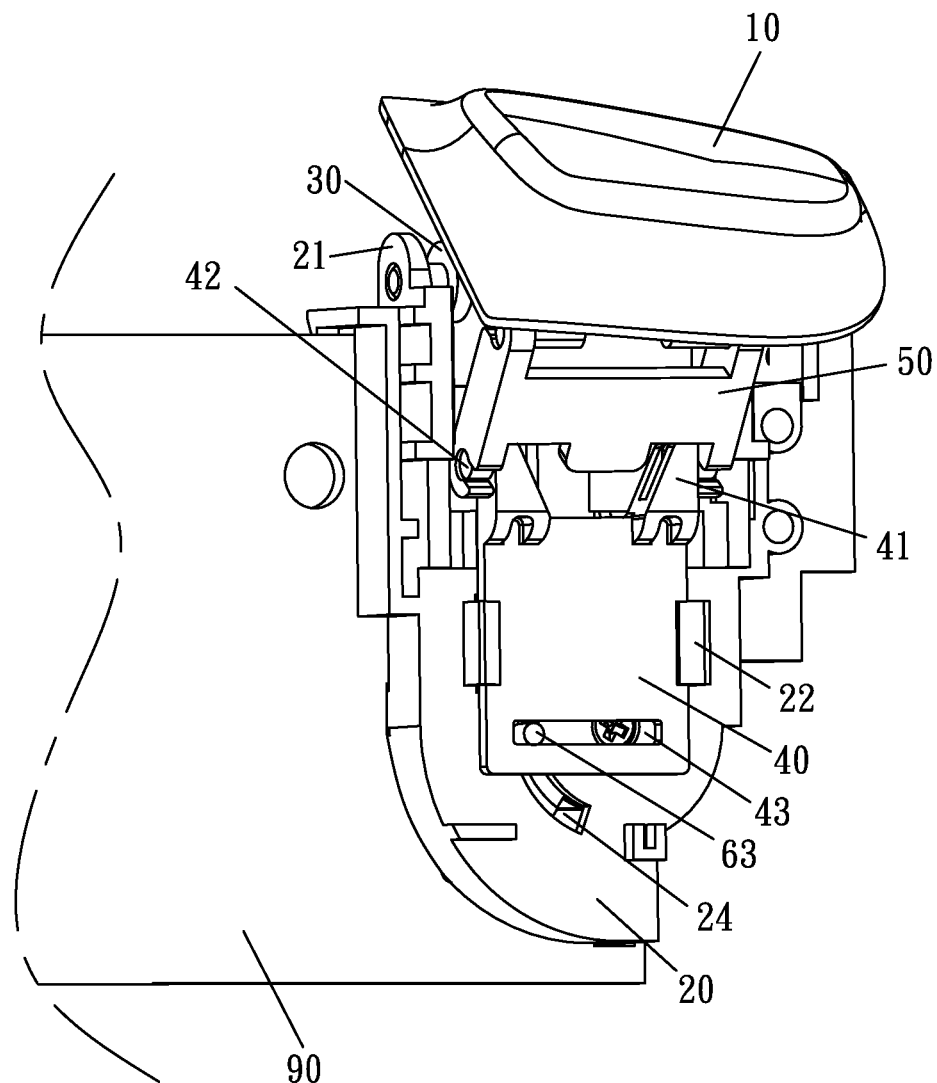
FIG. 4 is an assembled perspective view showing that the button structure of FIG. 2 is pressed by an external force.

Referring to FIG. 2 and FIG. 4, in use, the sliding part 40 can slide on the base frame 20 along the front-to-rear direction by virtue of the drive part 50 under the push of the button body 10 and the elastic part. The sliding of the sliding part 40 can drive the guide pillar 63 to slide rearward and forward along the guide slot 24 under the cooperation of the guide slot 24 and the guide channel 43 and further drive the rotating part 60 to rotate with respect to the circuit board 90. The rotation of the rotating part 60 further drives the electronic components to electrically connect with or disconnect from the circuit board 90.

In detail, when the button body 10 is pressed rearward, the driving pivotal arms 70 pushes the drive part 50 to drive the sliding part 40 to slide rearward along the sliding path 23 of the base frame 20 by virtue of the rotation pivot of the second and the third pivot shafts 71, 42 and the pivot holes 52 because the driving pivotal arms 70 are shorter than the immovable pivotal arms 30 in length. The sliding part 40 further pushes the guide pillar 63 to slide rearward along the guide slot 24 under the cooperation of the guide slot 24 and the guide channel 43, so as to drive the rotating part 60 to rotate horizontally. The rotation of the rotating part 60 further drives the electronic components to rotate with respect to the circuit board 90 and electrically connect with the circuit board 90. When the button body 10 is set free, the elastic part pushes the drive part 50 forward by the elasticity thereof to drive the sliding part 40 forward and further home the button body 10, so that further drives the guide pillar 63 to slide forward so as to drive the rotating part 60 to rotate back. The back rotation of the rotating part 60 drives the electronic components to rotate back with respect to the circuit board 90 and electrically disconnect from the circuit board 90.

As described above, the button structure in this invention utilizes the cooperation of the button body 10, the base frame 20, the sliding part 40, the drive part 50, the elastic part and the rotating part 60 to convert the actions in different directions (namely converting the action of pushing the button body 10 along the front-to-rear direction into the rotation of the rotating part 60 in a direction parallel to the circuit board 90), so as to achieve the electrical connection and disconnection of the electronic components fixed on the rotating part 60 and the circuit board 90 horizontally disposed in the game controller 100. In general, the button structure used in the game controller 100 can utilize the cooperation action of machinery to coordinate the actions in the different directions easily.

What is claimed is:

1. A button structure used in a game controller in which a circuit board is disposed, comprising:
    a button body assembled in a front face of the game controller;
    a base frame fixed in the game controller and located parallelly over the circuit board, the button body having a lower portion thereof pivoted to a front end of the base frame, a rear of the base frame defining an arc-shaped guide slot extending along a front-to-rear direction;
    a sliding part with a guide channel being transversely opened in a rear thereof;
    a drive part, the sliding part being slidably mounted on the base frame along the front-to-rear direction by virtue of the drive part being rotatably pivoted between an upper portion of the button body and a front end of the sliding part under the elasticity of an elastic part, the elastic part being flexibly clamped between the drive part and the base frame; and
    a rotating part with electronic components being fixed thereon and away from a rotation axis thereof, a guide pillar being protruded at a position of the rotating part away from the rotation axis, the rotating part being rotatably mounted to the rear of the base frame through the rotation axis thereof being pivoted to the centre of a circle of the guide slot, the rotating part being parallelly rotatable between the base frame and the circuit board, the guide pillar passing through the guide slot to be slidably inserted in the guide channel of the sliding part;
    wherein the sliding part can slide on the base frame along the front-to-rear direction by virtue of the drive part under the push of the button body and the elastic part, the sliding of the sliding part can drive the guide pillar to slide rearward and forward along the guide slot under the cooperation of the guide slot and the guide channel and further drive the rotating part to rotate with respect to the circuit board, the rotation of the rotating part further drives the electronic components to electrically connect with or disconnect from the circuit board.

2. The button structure as claimed in claim 1, further comprising a pair of immovable pivotal arms, wherein the immovable pivotal arms have front ends thereof fixed to two sides of a lower position of a rear face of the button body, and rear ends thereof define a pair of first pivot shafts, a pair of connecting arms is protruded at two sides of the front end of the base frame with a pair of pivot portions formed thereon, the button body is pivoted to the base frame by virtue of the cooperation of the first pivot shafts of the immovable pivotal arms and the pivot portions of the connecting arms.

3. The button structure as claimed in claim 2, further comprising a pair of driving pivotal arms, wherein the driving pivotal arms have front ends thereof fixed to two sides of an upper position of the rear face of the button body, and rear ends thereof define a pair of second pivot shafts, two sides of the front end of the sliding part protrude forward to form a pair of extension arms, a pair of third pivot shafts is oppositely protruded sideward at front ends of the extension arms, the drive part is substantially of H-shape of which two lateral arms each has two free ends thereof define a pivot hole respectively, the second pivot shafts of the driving pivotal arms and the third pivot shafts of the extension arms are pivoted to front two and rear two of the pivot holes of the drive part respectively.

4. The button structure as claimed in claim 3, wherein the driving pivotal arms are shorter than the immovable pivotal arms in length.

5. The button structure as claimed in claim 1, wherein a pair of restraining blocks is protruded at two sides of a substantial middle of a surface of the base frame opposite to the circuit board, and bent towards each other to define a sliding path between the base frame and the restraining blocks, the guide slot is located in rear of the sliding path, the sliding part is slidably disposed in the sliding path by means of the restraint of the restraining blocks.

6. The button structure as claimed in claim 1, wherein a hole is opened at the centre of the circle of the guide slot of the base frame, the rotating part has a substantially disc-shaped base board of which the center perpendicularly protrudes to form the rotation axis, the base board further perpendicularly protrudes towards the same direction as the rotation axis to form the guide pillar at a substantial edge away from the rotation axis, the rotating part is rotatably mounted to the rear of the base frame through the rotation axis is pivoted to the hole of the base frame.

\* \* \* \* \*